US007656637B2

(12) United States Patent  
McAvoy et al.

(10) Patent No.: US 7,656,637 B2  
(45) Date of Patent: Feb. 2, 2010

(54) POWER CONTROL SYSTEM PSEUDO POWER-UP, AIRCRAFT INCLUDING THE POWER CONTROL SYSTEM AND METHOD OF CONTROLLING POWER IN AN AIRCRAFT

(75) Inventors: Michael B. McAvoy, Lynnwood, WA (US); Phuoc D. Nguyen, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/554,433

(22) Filed: Oct. 30, 2006

(65) Prior Publication Data

US 2007/0081284 A1    Apr. 12, 2007

Related U.S. Application Data

(63) Continuation-in-part of application No. 11/249,127, filed on Oct. 11, 2005, now Pat. No. 7,580,235.

(60) Provisional application No. 60/663,455, filed on Mar. 18, 2005, provisional application No. 60/618,295, filed on Oct. 12, 2004.

(51) Int. Cl.  
 *H01H 73/00* (2006.01)
(52) U.S. Cl. ..................................... 361/115
(58) Field of Classification Search ............ 340/3.3; 361/115  
See application file for complete search history.

(56) References Cited

U.S. PATENT DOCUMENTS

| | | | | |
|---|---|---|---|---|
| 4,556,882 A | * | 12/1985 | Brifman et al. | 340/3.44 |
| 4,845,594 A | * | 7/1989 | Wilkerson | 361/71 |
| 5,517,381 A | * | 5/1996 | Guim et al. | 361/102 |
| 5,844,329 A | * | 12/1998 | Bailey et al. | 307/66 |
| 5,987,573 A | * | 11/1999 | Hiraka | 711/156 |
| 6,259,378 B1 | * | 7/2001 | Block | 340/963 |
| 6,289,267 B1 | * | 9/2001 | Alexander et al. | 700/286 |
| 2006/0071559 A1 | | 4/2006 | Hanson | |
| 2006/0108873 A1 | | 5/2006 | Hamasaki | |

* cited by examiner

*Primary Examiner*—Stephen W Jackson  
*Assistant Examiner*—Ann T Hoang  
(74) *Attorney, Agent, or Firm*—Law Office of Charles W. Peterson, Jr.

(57) ABSTRACT

A power control system with a pseudo-power up, an aircraft including the power control system and a method of controlling power in an aircraft. On-board wiring is protected from faults by electronic circuit breakers (ECBs), which may also control AC/DC electrical power supplies of on-board electrical/electronic equipment. A computer processor operating a user interface, e.g., a graphical user interface (GUI), through a display. An on-board store stores the GUI, other computer applications and the current state of each ECB, e.g., in a breaker state table. In a pseudo-power mode up, the stored circuit breaker state is available without providing power to the ECBs and, correspondingly to the coupled on-board electrical systems. When terminated, the system can power off, or proceed to normal power where each ECB is configured according to the breaker state table prior to providing power to protected systems.

19 Claims, 3 Drawing Sheets

POWER CONTROL SYSTEM PSEUDO POWER-UP, AIRCRAFT INCLUDING THE POWER CONTROL SYSTEM AND METHOD OF CONTROLLING POWER IN AN AIRCRAFT

CROSS REFERENCE TO RELATED APPLICATION

The present invention is a continuation in part of published U.S. Patent Application No.2006/0108873, Ser. No. 11/249,127, entitled "SYSTEMS AND METHODS FOR MONITORING AND CONTROLLING CIRCUIT BREAKERS," to Hamasaki et al., filed Oct. 11, 2005, now U.S. Pat. No. 7,580,235 which claims priority on provisional application number 60/663,455, filed Mar. 18, 2005, which claims priority on provisional application number 60/618,295, filed Oct. 12, 2004, all assigned to the assignee of the present invention and incorporated herein by reference.

BACKGROUND OF THE INVENTION

1. Field of the Invention

The present invention generally relates to powering and maintaining power controlled power systems and, more particularly, to powering and maintaining power controlled aircraft power systems protected by electronic circuit breakers.

2. Background Description

Typical commercial transport aircraft include multiple, complex electrical systems with hundreds of circuit breakers protecting those systems from over-current conditions, traditionally, with Thermal Circuit Breakers (TCB). Thermal circuit breakers normally trip open to protect circuits when enough current passes through the breaker to heat the breaker above a trip point. Additionally, a thermal circuit breaker may be manually opened by pulling on a push/pull breaker switch prior to maintenance, in order to prevent equipment from becoming energized and causing damage, injury, or death. Frequently, tags and locks are attached to open circuit breakers to convey important safety information, and to prevent dangerous closures. Once maintenance is complete, tags and locks must be removed, and the thermal circuit breakers must be manually closed by depressing the push/pull breaker switch. Typical thermal circuit breakers are relatively heavy and require substantial additional aircraft wiring. Since, these heavy thermal circuit breakers are far from optimum or efficient, for this and for many other reasons, some aircraft manufacturers have turned to solid state technology.

Instead, these aircraft manufacturers are replacing heavy thermal circuit breakers with remotely located, Solid State Power Controllers (SSPCs) or Electronic Circuit Breakers (ECBs) for improved circuit protection, ease of use and improved personnel safety. A typical state of the art ECB mimics the states of a standard TCB, i.e., closed, opened/tripped, or locked out. Typically, an internal local processor controls each ECB. A centralized interface processor provides control signals over a data bus to coupled ECBs. Each selected ECB switches states in response these control signals and, may respond to the centralized interface processor with an electrical signal that indicates its current breaker state. ECB state information, including electronic representations of tags and locks, is normally stored in internal ECB non-volatile storage. Since ECBs are electronically controlled by the processor, they can be controlled from any processor interface, regardless of the actual ECB location. So, for example, mechanics, pilots, or other users can remotely determine and change the current state of ECBs without leaving the aircraft flight deck.

Unfortunately, without electrical power, the breaker state is unknown. Because they are fully electronic/electronically controlled, the ECB must have electrical power to view or alter the current ECB state. This can cause problems when electrical power is initially applied or restored. For example, when the airplane is unpowered, a mechanic is not able to open an unpowered ECB prior to a maintenance activity. If the mechanic proceeds with the activity and, subsequently, power is applied to the airplane, the equipment being maintained could be inadvertently powered. This is a hazardous condition, and consequently, could lead to injury or death to the mechanic, or could cause damage to the airplane.

Additionally, if an ECB is replaced during maintenance, the internal state data may be lost or disturbed. This could have the same hazardous consequences, i.e., protected equipment could become inadvertently powered. Furthermore, many ECBs are normally integrated together in a single Line Replaceable Module, (LRM). So, replacing a single such module could impact many individual ECBs and, therefore, many different airplane systems.

Accordingly, there is a need for monitoring and inspecting aircraft electronic circuits during maintenance procedures even in unpowered aircraft and especially during power distribution system maintenance. More particularly, there is a need to allow maintenance personnel to engage in such activity without risking damage to the aircraft, and while protecting personnel from injury or death.

SUMMARY OF THE INVENTION

An embodiment of the present invention includes a power control system with a pseudo-power up, an aircraft including the power control system and a method of controlling power in such an aircraft. On-board electrical wiring is protected from over-current situations or short circuit faults by electronic circuit breakers (ECBs). The AC or DC electrical power supplies of on-board electrical/electronic equipment are also controlled by electronic circuit breakers (ECBs). The power control system includes a computer processor operating a user interface, e.g., a graphical user interface (GUI), through a display. The GUI and other computer applications are stored on-board in storage that also stores the current state of each ECB, e.g., in a breaker state table. While the aircraft is otherwise unpowered, the centralized processor may be operated from battery power in a pseudo-power up mode. In this mode, the GUI display current state information, tags and locks from the breaker state table. Changes may be made to breaker states and changes are stored back in the breaker state table. In this way, a mechanic can determine and control the system protection state. The remainder of the power control system, including the ECBs and, correspondingly, the coupled electrical equipment, remains unpowered. Thereafter, the mechanic may then turn off the centralized processor and return to a completely unpowered mode, or proceed with a normal aircraft power-up sequence.

During normal power-up sequence the processor enables each ECB according to the breaker state table prior to powering up the power distribution system. Each ECB validates its configuration, including checking for any state changes. After completing the power up system initialization, the power distribution system energizes aircraft systems with ECBs configured according to the breaker state table configuration. So, any circuit that was disabled when the power distribution system was powered down, remains disabled and is not allowed to energize until after appropriate maintenance action to change the breaker state, e.g., resetting the breaker.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
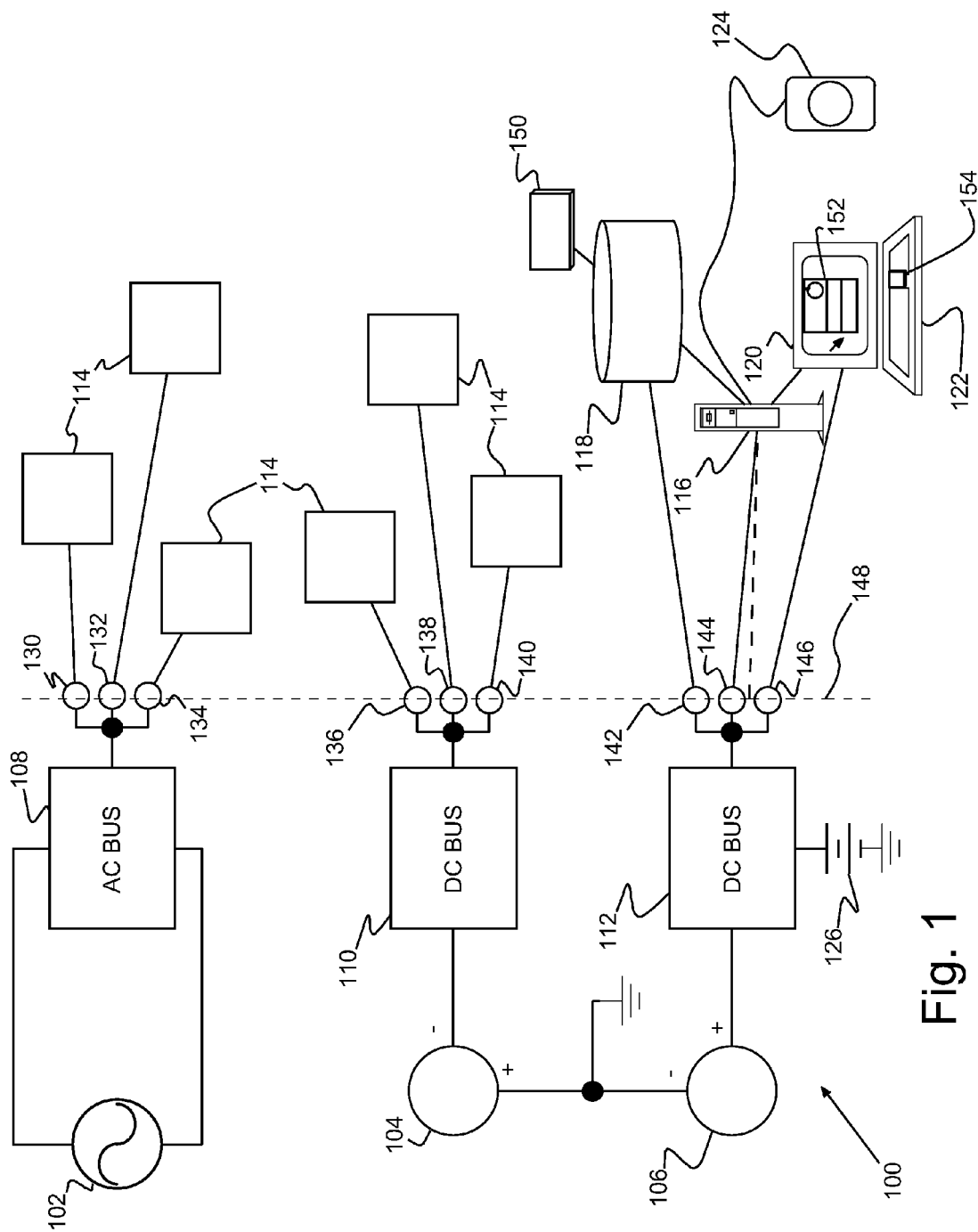
FIG. 1 shows an example of an aircraft electronics power distribution system with a pseudo power-up, wherein even when power is not provided to the power distribution system, a power state may be determined for system Solid State Power Controllers (SSPCs) or Electronic Circuit Breakers (ECBs) according to a preferred embodiment of the present invention.

Turning now to the drawings and more particularly, FIG. 1 shows an example of an aircraft electronics power distribution system 100 with a pseudo power-up, wherein even when power is not provided to the power distribution system, a power state may be determined for system Solid State Power Controllers (SSPCs) or Electronic Circuit Breakers (ECBs) according to a preferred embodiment of the present invention. In particular the present invention has application to any state of the art power distribution system that is protected by one or more ECBs, such as the power distribution system described in, for example, published U.S. Patent Application No. 2006/0108873, Ser. No. 11/249,127, entitled "SYSTEMS AND METHODS FOR MONITORING AND CONTROLLING CIRCUIT BREAKERS," to Hamasaki et al., filed Oct. 11, 2005, assigned to the assignee of the present invention and incorporated herein by reference.

The preferred power distribution system 100 is shown in this example with three power supply sources, an Alternating Current (AC) source 102 and two Direct Current (DC) sources 104, 106, each supplying a respective power bus 108, 110, 112. Each power bus 108, 110, 112 supplies power to platform resources or protected electronic systems, represented as loads 114, and including Flight Deck (F/D) console instrumentation and control 116, 118, 120, 122, 124. In this example power bus 112 includes an alternative or auxiliary supply, i.e., a battery 126. Although shown only for DC power bus 112, this is for example only, and each bus 108, 110, 112 may include auxiliary power. Each of the loads, 114, 116, 118, 120, 122, 124 is protected by a respective electronic circuit breaker 130, 132, 134, 136, 138, 140, 142, 144, 146.

The electronic circuit breakers (hereinafter breakers) 130, 132, 134, 136, 138, 140, 142, 144, 146 are normally located and contained in what are known as Power Distribution Controllers (PDCs). Also, the breakers 130, 132, 134, 136, 138, 140, 142, 144, 146 are under processor 116 control through connection to one or more data busses 148, e.g., by operation of the Common-Core Computing Resource (CCR) (an application operating in the processor 116) for the Boeing 787. Links between system components, including bus/busses 148 may be hardwired or wireless, depending upon the nature of the components and the particular installation. The CCR may be maintained in on-board storage or memory 118, which includes non-volatile storage, e.g., hard disk drive storage, Static Random Access Memory (SRAM) with battery back up, or Flash Storage or memory. On-board storage 118 also may include volatile storage as main memory for normal processor 116 operation, e.g., Dynamic Random Access Memory (DRAM) or SRAM. Preferably, on-board storage 118 is in a centralized location, located apart from the power distribution system components.

The processor 116 also maintains an up-to-date account of the current state of each breaker 130, 132, 134, 136, 138, 140, 142, 144, 146 in on-board storage 118, e.g., in a table 150, referred to herein as the breaker state table 150. This example also includes a display 120 and a keyboard 122 for information input/output (I/O). Preferably, breaker status is displayed on the display 120 in a suitable graphical user interface (GUI) 152, also under processor 116 control and hosted by the CCR. The GUI 152 may include user-selectable indicators or icons (hereinafter, selector icons) presented in a suitable menu. The GUI 152 also may include a typical cursor or pointer that is responsive to manual gestures, e.g., from keyboard 122, by touch (on a touch-screen display 120), by moving a mouse, rolling a trackball 124 or using another suitable input device. Also, the flight deck console includes a "Battery Mode" switch, e.g., 154 on keyboard 122, for initiating pseudo power-ups. Normally, except as indicated hereinbelow, the preferred power distribution system 100 operates substantially as described in Hamasaki et al.

Breakers 130, 132, 134, 136, 138, 140, 142, 144, 146 may include, for example, solid state power controllers (SSPCs), solid state relays (SSRs), and/or other electronic power control devices (e.g., electrical load controller functions, or ELCFs) configured to provide a circuit breaker function. The processor 116 also receives signals from each of the breakers 130, 132, 134, 136, 138, 140, 142, 144, 146 (e.g., state signals) and provides or directs state change signals to the breakers 130, 132, 134, 136, 138, 140, 142, 144, 146. Optionally, for some circuit breakers (e.g., mechanical devices), the state of the circuit breaker can be monitored and presented, but not changed in an automated fashion. The breaker state table 150 indicates the current state of each breaker 130, 132, 134, 136, 138, 140, 142, 144, 146 and as the processor 116 changes state of a breaker the processor 116 updates the corresponding entry in the breaker state table 150 for that particular breaker.

Figure 2:
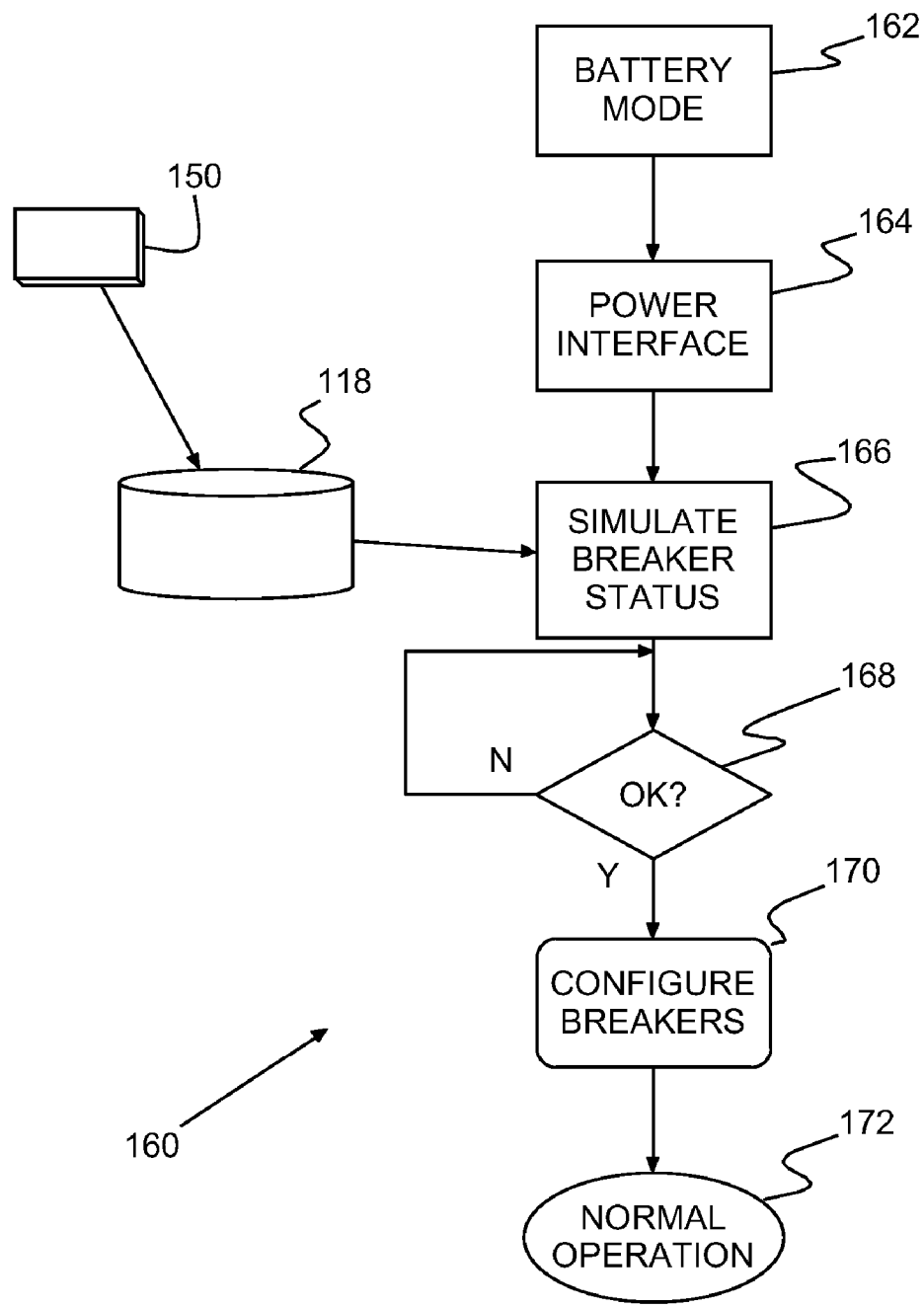
FIG. 2 shows a flow diagram example of operation of a preferred power distribution system.

FIG. 2 shows a flow diagram example 160 of operation of a preferred power distribution system with reference to the exemplar system 100 of FIG. 1. First a pseudo power-up is initiated in step 162, e.g., by pressing the battery mode switch 154 on flight deck console keyboard 122. With battery mode selected, in step 164 the processor 116, the display(s) 120, keypad 122, and cursor control device 124 power up and begin running the CCR. However, since the CCR does not provide power to the breakers 130, 132, 134, 136, 138, 140, none are enabled; and, as a result, neither are any of the protected loads 114. In step 166 the CCR retrieves the breaker state table 150 from on-board store 118 and provides an indication of the power on state for each breaker 130, 132, 134, 136, 138, 140, e.g., on display 120.

Then, for example, an airplane mechanic can view or alter the state data for any breaker 130, 132, 134, 136, 138, 140 without risking inadvertently energizing connected circuits, i.e. loads, 114. Once the mechanic has completed servicing the aircraft, in step 168 the mechanic or other personnel may terminate battery mode and proceed normally with a modified airplane power-up sequence, e.g., initiating normal power up through GUI 152, but with the breakers 130, 132, 134, 136, 138, 140 preconditioned according to the state in breaker state table 150.

So, in step 170 the CCR uses the breaker state table 150 information to precondition the breakers according to the respective power down state, such that each breaker 130, 132, 134, 136, 138, 140 will power up energized or remain unenergized according to the breaker state table 150. Finally, in step 172, the breakers 130, 132, 134, 136, 138, 140 are energized to power up the protected system units and the aircraft operates normally. Thus, with the power distribution system 100 energized, protected system units and circuits (loads 114) are powered according to the configuration data in the breaker state table 150. Further, any unit that was previously disabled (i.e., while the power distribution controllers are powered down), does not energize, for example, until an appropriate maintenance action is taken to change the state, e.g., resetting the breaker.

Figure 3:
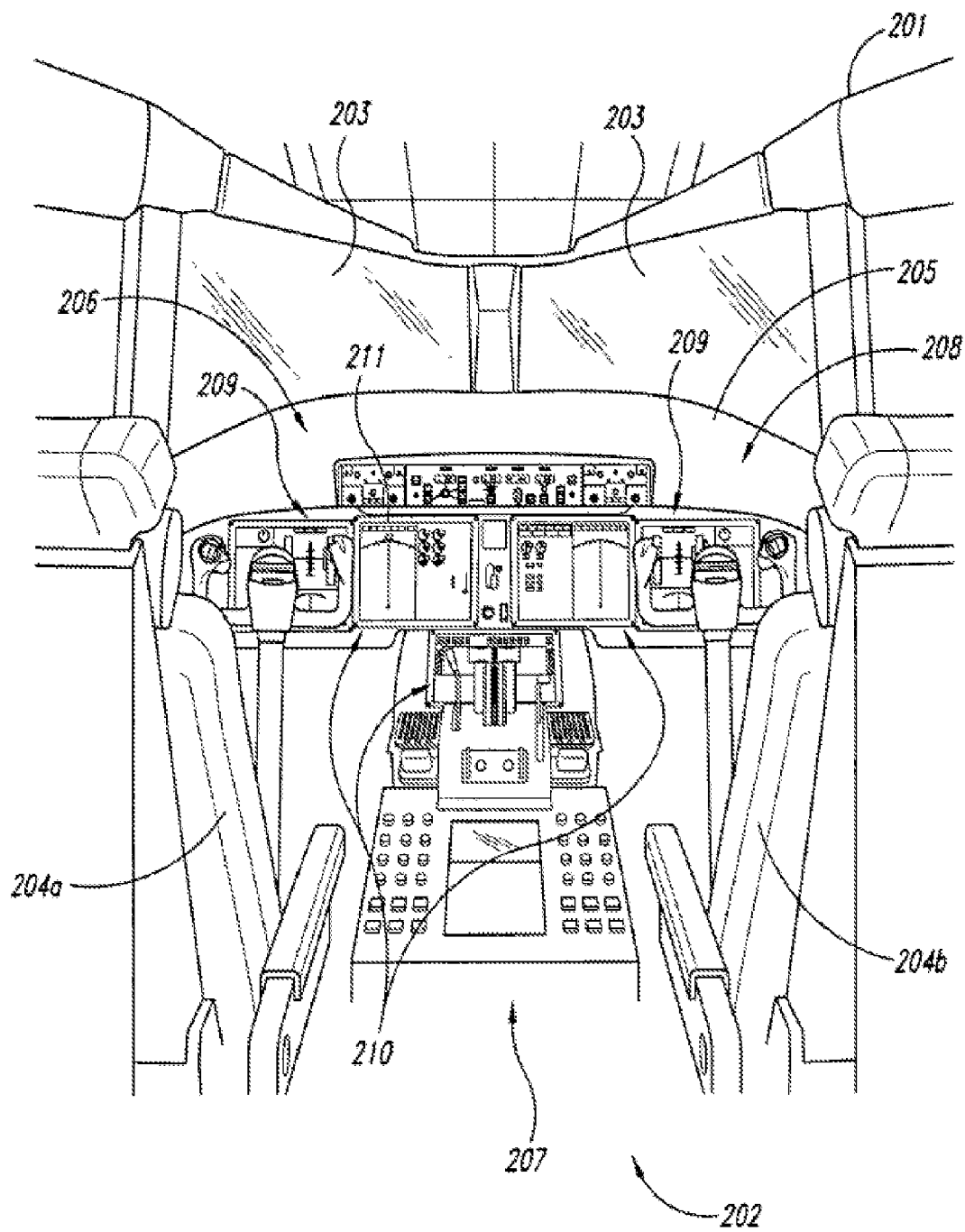
FIG. 3 shows a forward portion of an aircraft at the flight deck housing a power distribution system with powered down status simulation capability.

FIG. 3 shows a forward portion of an aircraft 201 in a flight deck 202 substantially similar to Hamasaki et al., housing a power distribution system with capability to simulate status while powered down according to embodiments of the invention. The flight deck 202 may include forward windows 203 providing a forward field of view from the aircraft 201 for an operator seated in a first seat 204a and/or a second seat 204b. Optionally, the forward windows 203 can be replaced with one or more external vision screens that include a visual display of the forward field of view out of the aircraft 201. A glare shield 205 can be positioned adjacent to the forward windows 203 to reduce the glare on flight instruments 206 positioned on a control pedestal 207 and a forward instrument panel 208.

The flight instruments 206 can include primary flight displays (PFDs) 209 that provide the operators with actual flight parameter information, and multifunction displays (MFDs) 210 that display other operator-selectable information. For example, one or more of the MFDs 210 can present a navigation display 211 containing navigational information. Other MFDs 210 (e.g., 129 in FIG. 1) can present information pertaining to aircraft circuit breakers, e.g., 130, 132, 134, 136, 138, 140 in FIG. 1. F/D information (including breaker state information) can also be presented at other display locations, including portable display terminals (not shown) that can be positioned at other locations in the aircraft.

So for example, when an aircraft mechanic selects battery mode in a pseudo-power up, the processor and display power up with the display providing breaker information that indicates the last active state of the breakers. Then, the mechanic can identify and service on-board systems without fear of damaging the aircraft or injuring or electrocuting him/herself during normal aircraft power up. Once the mechanic has completed reviewing/changing breaker states, the mechanic can simply shut down and continue servicing the aircraft or, the mechanic or other personnel may proceed with a modified-normal power-up sequence. The CCR uses the breaker state table information to precondition the breakers according to the respective power down state.

Advantageously, this pseudo-power up/modified-normal power up may be included as part of the aircraft automatic self-check and configuration process; wherein each SSPC validates its configuration with the CCR, including checking for any state changes to any SSPC. Further, in this modified-normal power-up sequence the processor enables the breakers according to the breaker state table prior to powering up the power distribution system. So, after completing the pseudo-power up system initialization, the power distribution system energizes protected aircraft systems according to the breaker state table configuration. Any circuit that was disabled when the power distribution system was previously powered down, remains disabled and is not allowed to energize until an appropriate maintenance action is taken to change the state, e.g., the breaker is reset.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A power control system controlling power to platform resources comprising:
   one or more electronic circuit breakers, each electronic circuit breaker providing over-current protection to a load;
   controlling means for controlling circuit breaker state for said each electronic circuit breaker;
   on-board storage storing the state of said each electronic circuit breaker, the state of all controlled electronic circuit breakers at power down being stored as a current state at power down;
   a user interface selectively indicating said stored current state;
   a display displaying said stored current state responsive to said user interface;
   means for altering the stored state while the platform is powered down, the altered state being stored as the current state; and
   means for selectively energizing said one or more electronic circuit breakers responsive to the displayed said stored current state, wherein during power up of platform resources said one or more electronic circuit breakers energize to said stored current state.

2. A power control system as in claim 1, wherein said state is one of a closed state, an open state and a tripped state for each controlled electronic circuit breaker.

3. A power control system as in claim 2, wherein said controlling means is a processor providing said user interface, said user interface is a graphical user interface and said processor alters the stored state for one or more electronic circuit breakers responsive to said means for altering.

4. A power control system as in claim 2, wherein said platform is an aircraft, said one or more electronic circuit breakers is a plurality of electronic circuit breakers protecting a plurality of loads, and said plurality of loads are aircraft electrical units.

5. A power control system as in claim 1, said means for altering comprising:
   means for energizing said controlling means, said on-board storage and said display independent of said one or more electronic circuit breakers.

6. A power control system as in claim 1, wherein said means for selectively energizing comprises a data bus connecting said one or more electronic circuit breakers to said controlling means.

7. A method of controlling electrical power in an aircraft, said method comprising the steps of:
   a) storing a current state reflecting the state of each of one or more on-board circuit breakers at power down of said aircraft;
   b) providing power to an on-board aircraft display, said aircraft remaining unpowered;
   c) retrieving from storage said current state, said current state including a power on state for each of one or more on-board circuit breakers;

d) displaying said current state for all said on-board circuit breakers;

e) selectively changing a respective state in storage in said current state to one or more corresponding said on-board circuit breaker; and f) configuring said all on-board circuit breakers responsive to said current state, wherein during aircraft power up said on-board circuit breakers energize to said current state.

8. A method of controlling electrical power as in claim 7, wherein the step (b) of providing power to the on-board display comprises selecting battery mode, power being provided to a processor and on-board storage storing said current state for each of said on-board circuit breakers, said method further comprising the step of:

g) terminating battery mode.

9. A method of controlling electrical power as in claim 8, wherein the step (g) of terminating battery mode powers up said aircraft, said each on-board circuit breaker powering up to a configured said current state.

10. A method of controlling electrical power as in claim 9, wherein said state is one of a closed state, an open state and a tripped state for each controlled electronic circuit breaker.

11. A method of controlling electrical power as in claim 10, wherein when battery mode is terminated in step (g) power is provided to said on-board circuit breakers, said on-board circuit breakers having a closed state providing power to respective protected aircraft electrical system units, said on-board circuit breakers having an open state and a tripped state blocking power from each respective protected aircraft electrical system.

12. A method of controlling electrical power as in claim 8, wherein the step (g) of terminating battery mode powers down said on-board aircraft display.

13. A method of controlling electrical power as in claim 7, wherein the step (e) of selectively changing a breaker state comprises:

i) replacing one or more of said on-board circuit breakers;

ii) changing the stored respective state in said current state; and iii) passing the respective said current state to the said replaced circuit breakers.

14. A method of controlling electrical power as in claim 7, wherein said current state is stored in a breaker state table in on-board storage.

15. A method of controlling electrical power as in claim 7, wherein the step (f) of configuring said all on-board circuit breakers comprises passing a respective said current state to each corresponding said on-board circuit breaker.

16. An aircraft comprising:

a plurality of on-board electrical systems;

a plurality of electronic circuit breakers, each having a closed state, an open state, and a tripped state and providing over-current protection to one of said on-board electrical systems;

at least one power supply coupled to ones of said plurality of electronic circuit breakers, power being provided to protected on-board electrical systems through closed ones of said plurality of electronic circuit breakers; and a power control system controlling power to said plurality of on-board electrical systems, said power control system comprising:

a computer processor, an on-board store storing applications running on said computer processor and a breaker state table indicating the current state of said each electronic circuit breaker, the computer processor storing as the current state the state of each of the plurality of electronic circuit breakers at power down of said aircraft, at least one manual input/output device, a display, at least one of said applications being a user interface selectively indicating the stored said current state on said display and receiving input from said at least one manual input/output device selectively changing a respective stored state to one or more corresponding circuit breaker in said stored current state, a data bus coupling said computer processor with said plurality of electronic circuit breakers, said computer processor controlling circuit breaker state for said each of said plurality of electronic circuit breaker, and an independent supply selectively providing power to said computer processor, said on-board store and said at least one manual input/output device independent of said plurality of electronic circuit breakers, wherein when power is provided by said independent supply power, a power state for said plurality of electronic circuit breakers may be displayed even when said at least one power supply is not powering said plurality of electronic circuit breakers, and during power up of said on-board electrical systems said one or more electronic circuit breakers energize to said stored current state.

17. An aircraft as in claim 16, wherein said user interface is a graphical user interface.

18. An aircraft as in claim 16, wherein said on-board store is non-volatile memory.

19. An aircraft as in claim 16, wherein said at least one manual input/output device comprises a keyboard.

* * * * *